United States Patent [19]

Lindstrom

[11] 3,985,431

[45] Oct. 12, 1976

[54] CREDIT CARD VALIDATION AID

[75] Inventor: Robert D. Lindstrom, Bridgeview, Ill.

[73] Assignee: Lawrence Peska Associates, Inc., New York, N.Y. ; a part interest

[22] Filed: Sept. 8, 1975

[21] Appl. No.: 611,557

[52] U.S. Cl. .................................. 353/94; 353/25
[51] Int. Cl.² ........................................ G03B 21/26
[58] Field of Search ................. 353/25, 26 R, 26 A, 353/94, 122

[56] References Cited
UNITED STATES PATENTS

| | | | |
|---|---|---|---|
| 1,918,468 | 7/1933 | Harding | 353/26 R |
| 3,632,196 | 1/1972 | De Pizzol | 353/25 |
| 3,667,838 | 6/1972 | Wood | 353/26 R |
| 3,861,792 | 1/1975 | Donati | 353/122 |
| 3,914,037 | 10/1975 | Peters | 353/26 R |

*Primary Examiner*—Harry N. Haroian
*Attorney, Agent, or Firm*—Jack D. Slobod

[57] ABSTRACT

A device operative with endless loop cartridges containing reflective microfilm lists of invalid credit cards is configured for receiving at a bank of slots separate cartridges to be supplied by each credit organization. A credit card holder has plural guides, each guide for the credit card of a different organization. A sensing switch is provided for detecting the presence of a credit card in a guide. The switches are each connected to associated ones of plural projector light sources, and plural magnetic clutches for driving the cartridges from a common motor. A projected list image for the associated credit card organization, is run serially past a segmented screen in response to the switch and a motor speed control unit.

2 Claims, 4 Drawing Figures

U.S. Patent Oct. 12, 1976 3,985,431
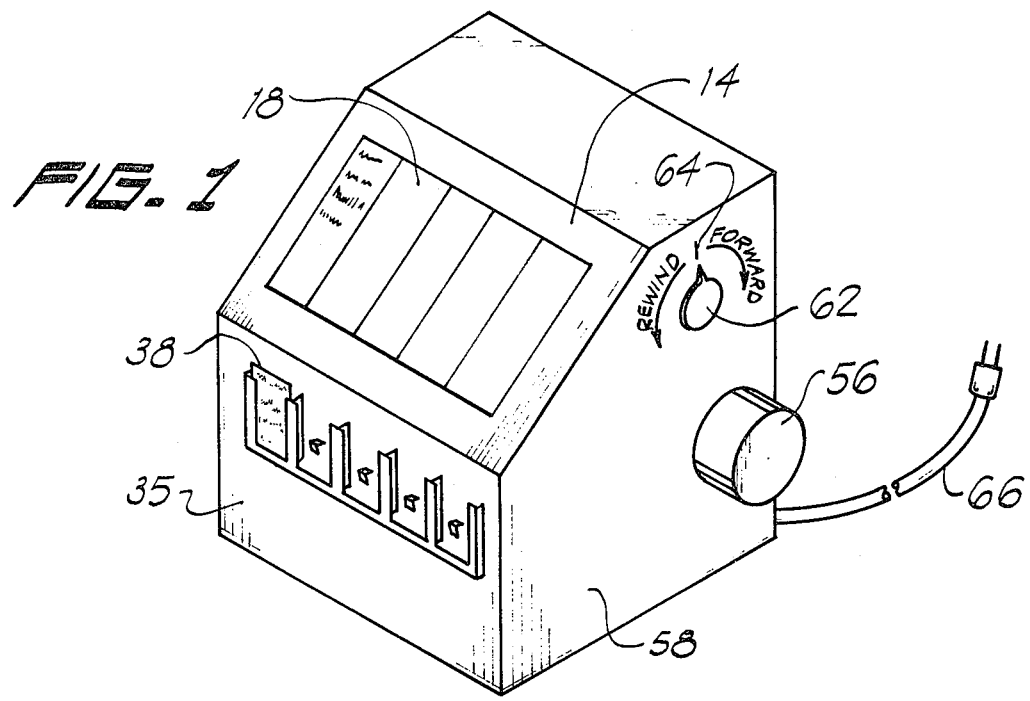
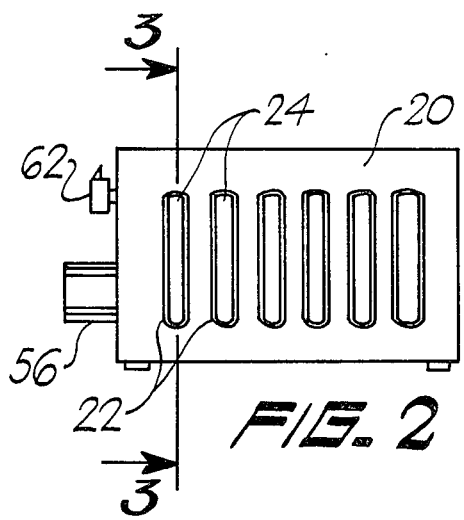
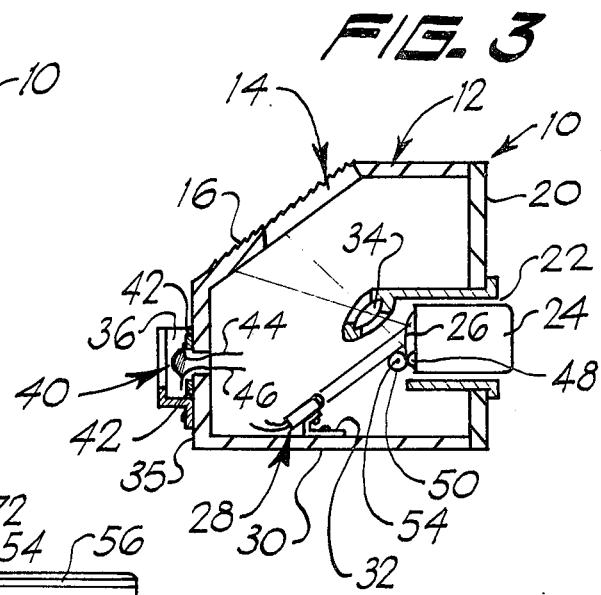
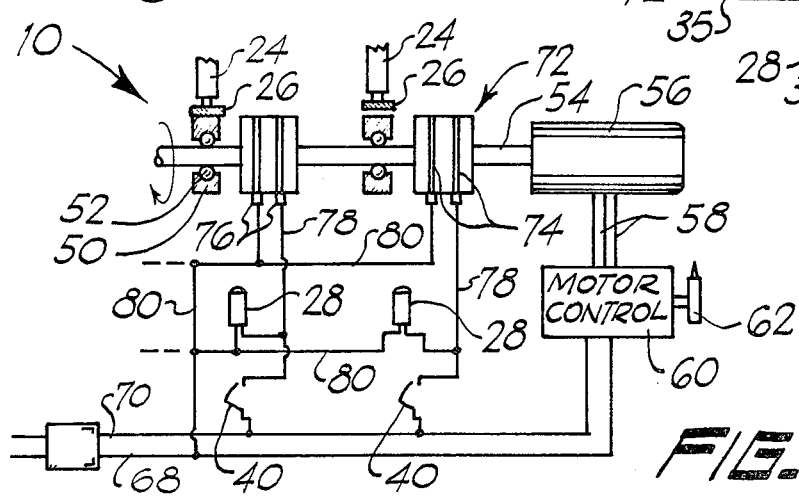

CREDIT CARD VALIDATION AID

FIELD OF THE INVENTION

The present invention relates generally to credit card validating apparatus. In its particular aspects the present invention relates to motorized apparatus for running automatically any selected one of plural lists of invalid credit card number indicia serially past a viewing area.

BACKGROUND OF THE INVENTION

Credit card validity is primarily checked today by viewing loose booklets or papers separately supplied by each different credit organization. These booklets or papers are easily misplaced and are time-consuming to utilize. While numerous automated credit card validity checking devices have heretofore been proposed, these have generally involved expensive digital computer type systems which scan machine readable lists and provide a signal indicating validity status.

In my opinion, such cumbersome equipment could be avoided by merely mechanizing a way for an updated list image of invalid credit card numbers, in proper alpha-numeric sequence to be serially run past a viewing area to allow the human eye to make the necessary comparison with a credit card to be checked.

OBJECTS OF THE INVENTION

It is an object of the present invention to provide a device for receiving plural separate list media issued by the different credit organizations having automatic means for passing visible indications from the media serially past a viewing area in response to an indication of the type of credit card to be checked.

It is a further object of the present invention to provide for an optical projector system for selective display of plural microfilms in cartridges.

SUMMARY OF THE INVENTION

Briefly, the aforementioned and other objects of the present invention are satisfied by providing a device having plural optical projectors for projecting onto a viewing screen invalid credit card reflective microfilm lists contained in endless loop cartridges. Plural cartridges are received simultaneously in the device in register with the associated projectors. A series of holders are provided for receiving credit cards from different credit organizations. A sensing switch is provided in each holder for energizing the projector for the cartridge of the associated credit card organization upon detection of a card within the holder. A magnetic clutch is also energized by the switch to enable the cartridge to be driven from a common motor driven shaft.

Thus, a list is serially formed on the viewing screen in response to placing the credit card in the appropriate holder to enable visual comparison with the credit card in a rapid manner.

Other objects, features and advantages of the present invention will become apparent upon perusal of the following detailed description of the preferred embodiment thereof when taken in conjunction with the appended drawing wherein:

FIG. 1 is a pictorial presentation of the credit card validator of the present invention generally in front and side elevation;

FIG. 2 is a rear elevation of the validator in FIG. 1;

FIG. 3 is a cross-sectional side view taken along the lines 3—3 in FIG. 2; and

FIG. 4 is a mechanical and electrical schematic for the validator.

DETAILED DESCRIPTION

Referring to FIGS. 1 through 4, of the drawing, the credit card validation aid of the present invention is generally indicated by the reference numeral 10. Validation aid 10 is contained in a sheet metal or plastic housing 12 which is generally rectangular in shape except that one edge thereof is replaced with an inclined face which is a transparent plate 14. The exterior surface 16 of plate 14 has a fine pebbly finish for optical diffusion in a known manner to permit an optical image to be formed thereon by projection from behind the plate. The plate 14 may be one large sheet or may be divided into separate laterally separated edge to edge segments 18. Each of the segments 18 is a separate viewing region as will become apparent as the discussion proceeds.

The rear face 20 of housing 12 has plural vertically elongated slot openings 22 therein. Slot openings 22 are laterally spaced apart, each in register with the center of a different one of viewing segments 18.

Plural rectangular cartridges 24, in the nature of eight-track tape cartridges, are respectively received in the slots 22. It is intended that each cartridge 24 is to be supplied in updated form each different credit organization. Rather than containing magnetic tape, each cartridge 24 contains an elongated endless loop of microfilm 26. The microfilm 26 contains reflective numerals on a black background in the form of a list of invalid credit card numbers.

Plural collimated light sources 28, which are spaced apart laterally in register with the slots 22 and segments 18, are carried above the base wall 30 of housing 12 by brackets 32. Light sources 28 are inclined upwards to be aimed respectively at the associated cartridge slots 22. Plural inclined magnification lenses 34 are carried by the housing intermediate a line between slots 22 and screen segments 18. As a result, the collimated light from sources 28 is reflected from the numerals on the film portion 26 at the interior end of the respective cartridges 24 and focussed in magnified form on the respective screen segments 18 to form a list image.

Across the front face 35 of housing 12, there are plural laterally spaced guides 36 for holding a credit card 38 from the side and bottom edges thereof. The guides 36 are preferably spaced laterally in register with screen segments 18. In the center of each guide 36 there is positioned a different microswitch 40, which is mounted on front face 35 either directly or via insulating pads 42 when appropriate in regard to the material making up housing 12. Microswitch 40 presents electrical continuity between its output leads 44 and 46 upon actuation of the switch by the presence of a credit card 38 in the associated guide 36.

The cartridge 24 has the usual driving roller 48 projecting therefrom over which the film 26 passes. The film 26 is advanced in cartridge 24, by a steel roller 50 positioned to sandwich film 26 between the roller and cartridge roller 48. The rollers 50 are rotatably supported via bearings 52 on a coaxial laterally extending shaft 54 which is journalled in opposite sides of housing 12. The shaft 54 is driven for rotation from an end thereof by an electric motor 56 carried by housing sidewall 58.

The field and armature within motor 56 are energized by leads 58 which are fed from a conventional motor control unit 60. Unit 60, which includes a rotatable knob 62 carried by sidewall 58, is of a conventional type which includes a center off position cooperating with a marking 64, on sidewall 58, and which controls the clockwise or counterclockwise rotation speed of the motor 56 in proportion to the angular deviation of knob 62 from marking 64. It will be recognized that one obvious way to mechanize motor control 62 is by an auto transformer in a bridge circuit. The motor control 62 is fed preferably directly from an A.C. power cord 66 composed of leads 68 and 70.

For selectively coupling the freely rotating rollers 50 to shaft 54, magnetic clutches 72 are provided. Clutches 72, which are spaced apart along the non-magnetic shaft 54 near the respective rollers 50, are basically axially wound electromagnetic coils having a pair of axially spaced circumferential contact rings 74 forming terminals thereof. When a suitable voltage is applied between rings 74 via brushes 76, the steel rollers 50 are drawn axially with a slight movement to end walls of the clutches 72, permitting the rollers to be driven by shaft 54 for advancing film 26.

The magnetic clutches 72 are respectively electrically connected in parallel with the associated collimated lamp light sources 28 via leads 78 and common leads 80. The common leads 80 are connected to lead 68 of the power cord. The individual leads 78 are connected to lead 70 of the power cord respectively via the associate one of microswitches 40. Thus when a credit card 38 is placed in a particular guide 36 the only the light source 28 and clutch 72 associated with that guide is energized in an automatic manner causing a list image to appear in the associated screen segment 18. The speed at which the image of the list is serially passed along segment 18 is varied by knob 62. Since the list is in alphanumeric sequence, the knob can be moved to a high speed, with occasional slow down for sampling until a list region of interest appears.

Having described the preferred embodiment of the present invention in specific detail, it should be noted that numerous modifications, additions and omissions in the details thereof are possible within the intended spirit and scope of the invention herein claimed.

What is claimed is:

1. A viewing device for receiving driveable cartridges of film containing lists of invalid numbers for credit cards of different types comprising: a housing having a viewing screen formed of a plurality of side by side segments; a plurality of side by side projector means in said housing, each said projector means being configured for receiving a different associated one of said plural film cartridges and for projecting an image therefrom onto a different associated one of said screen segments, each said projector means including roller means for drivingly engaging the film in said associated cartridge and an associated lamp means for illuminating the film in said associated cartridge; a motor carried by said housing; a rotary shaft coupled to said motor for being driven therefrom, said shaft being directed proximate the roller means of each said projector means; plural electromagnetic clutch means carried by said shaft respectively proximate to and associated with each said roller means for selectively drivingly coupling said shaft and said roller means in response to electrical energization of said associated clutch means; plural means carried by said housing respectively proximate a different associated one of said segments for respectively holding a credit card of a different type, each credit card type being associated with a different one of said projector means, plural switch means respectively proximate each said credit card holding means for detecting the presence of a credit card therein; each said switch means being coupled electrically in a circuit for energizing said clutch means and said lamp means of said associated projector means in response to the detection of the presence of said credit card in said holding means.

2. The device of claim 1 wherein each said projector means is configured for reflecting light from said associated lamp means off of the film in said associated cartridge and then onto the associated viewing screen segment.

* * * * *